(12) United States Patent
Cheng et al.

(10) Patent No.: US 10,309,847 B2
(45) Date of Patent: Jun. 4, 2019

(54) TORQUE SENSOR

(71) Applicants: Peng Cheng, Sundsvall (SE); Bengt Oelmann, Sundsvall (SE); Muhammad Nazar Ul Islam, Sundsvall (SE)

(72) Inventors: Peng Cheng, Sundsvall (SE); Bengt Oelmann, Sundsvall (SE); Muhammad Nazar Ul Islam, Sundsvall (SE)

( * ) Notice: Subject to any disclaimer, the term of this patent is extended or adjusted under 35 U.S.C. 154(b) by 0 days.

(21) Appl. No.: 15/741,248

(22) PCT Filed: Jul. 13, 2016

(86) PCT No.: PCT/EP2016/066674
§ 371 (c)(1),
(2) Date: Dec. 30, 2017

(87) PCT Pub. No.: WO2017/009385
PCT Pub. Date: Jan. 19, 2017

(65) Prior Publication Data
US 2018/0188126 A1    Jul. 5, 2018

(30) Foreign Application Priority Data

Jul. 15, 2015 (EP) ................................ 15176863

(51) Int. Cl.
*G01L 3/00* (2006.01)
*G01L 3/04* (2006.01)
*G01L 25/00* (2006.01)

(52) U.S. Cl.
CPC .............. *G01L 3/04* (2013.01); *G01L 25/003* (2013.01)

(58) Field of Classification Search
CPC ................................ G01L 3/04; G01L 25/003

USPC ....................................................... 73/862.321
See application file for complete search history.

(56) References Cited

U.S. PATENT DOCUMENTS

| 2003/0226400 A1* | 12/2003 | Rutherford ......... B60C 23/0496 73/146.8 |
| 2004/0093952 A1* | 5/2004 | Eisenbarth ................ G01L 7/04 73/732 |
| 2006/0075823 A1* | 4/2006 | Grudzien .............. G01L 9/0072 73/718 |
| 2010/0174270 A1* | 7/2010 | Charlez ............... A61M 1/0013 604/540 |
| 2013/0145572 A1* | 6/2013 | Schregardus ....... A47L 11/4036 15/319 |
| 2014/0009748 A1* | 1/2014 | Leonessa ................. G01C 3/08 356/4.03 |
| 2018/0186198 A1* | 7/2018 | Zhou ..................... B60C 23/003 |

FOREIGN PATENT DOCUMENTS

DE        102006034143        1/2008

* cited by examiner

*Primary Examiner* — Max H Noori
(74) *Attorney, Agent, or Firm* — Fasth Law Offices; Rolf Fasth

(57) ABSTRACT

The torque sensor has a body. A first gastight chamber is defined at least partly by the body. A pressure sensor is connected with the gastight chamber for measuring the pressure in the gastight chamber. A pressure to torque converter is connected to the pressure sensor. The gastight chamber is arranged to change its volume by deformation of the body when the body is subjected to a torque wherein the volume change causes a change of pressure of the enclosed gas in the gastight chamber.

15 Claims, 13 Drawing Sheets

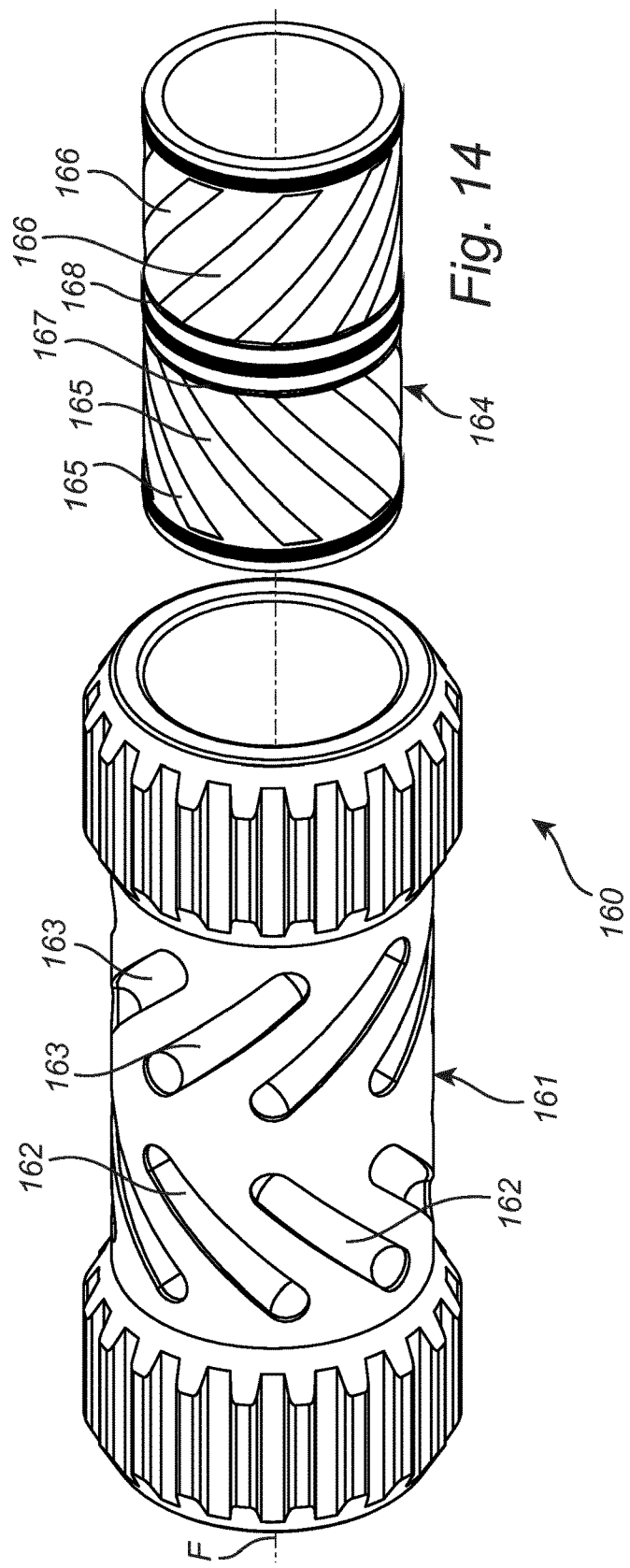

TORQUE SENSOR

PRIOR APPLICATIONS

This is a US national phase patent application that claims priority from PCT/EP2016/066674, filed 13 Jul. 2016, that claims priority from European Patent Application No. 15176863.7, filed 15 Jul. 2015.

FIELD OF THE INVENTION

The present invention relates to a torque sensor.

BACKGROUND OF THE INVENTION

Torque sensors are used in a lot of applications in mechanical industry, such as measurement, control and optimization of machines, quality assurance during assembly, safety and reliability testing, and so on.

The torque sensors are typically shaft-mounted. The most common shaft-mounted torque sensors currently used in mechanical industry are based on the strain gauge method, which measures the shaft deformation by bonding strain gauges on the surface of the shaft at opposite angles to the axial line and measuring their resistance change due to the torque-induced compressive and tensile strain on the shaft. The performance of such torque sensor based on strain gauges is mainly limited by low signal-to-noise ratio due to the small gauge factor of the alloy used in strain gauge, high sensitivity to the shaft surface treatment and to the property of the bonding glue and its process of bonding the strain gauge to the treated surface, and high sensitivity to environmental factors such as package stress, temperature and humidity change.

Another type of shaft-mounted torque sensor is based on the magneto-elastic effect, which is also called Villari effect, where whole or parts of the shaft that is made of certain ferromagnetic alloys, such as NiCo, Galfenol and Terfenol-D, change their magnetic property due to the applied torque. The magnetic property change then changes the inductance of one or more stator-mounted sensing coils, so the measured inductance change indicate the shaft torque. The performance of such a torque sensor based on magneto-elastic effect is mainly limited by the obvious nonlinearity and hysteresis together with the saturation limit of the magneto-elastic effect in different ferromagnetic materials, and the high sensitivity to the temperature gradient on the shaft and to the ambient electro-magnetic interference.

U.S. Pat. No. 3,581,562 discloses a torque sensor using a change of pressure in a closed space for detecting the applied torque. The torque sensor has a hollow body and two shafts, which are movable within the body both for rotation and for axial movement. Each shaft is mounted with a spring, such that the spring force has to be overcome to rotate the shaft. The shafts are provided with guiding grooves extending obliquely to a longitudinal torque axis of the torque sensor at the outside surfaces of the shafts. The body is provided with pins, which engage with the grooves. When the torque sensor is subjected to a torque which rotates the shafts, the guiding grooves moves relative to the pins, causing the shafts to move axially towards each other while rotating. The torque sensor has liquid filled chamber between the ends of the shafts, and a gauge, which measures the decrease of volume of the chamber caused by the axial movements of the shafts. The volume decrease is proportional to the torque. This prior art torque sensor has a limited accuracy and resolution.

SUMMARY OF THE INVENTION

It would be advantageous to provide a torque sensor with a higher resolution and/or accuracy than the prior art methods.

To better address this concern, in a first aspect of the invention there is presented a torque sensor comprising a body, a first gastight chamber defined at least partly by the body, a pressure sensor connected with the gastight chamber for measuring the pressure in the gastight chamber, and a pressure to torque converter connected with the pressure sensor. The gastight chamber is arranged to change its volume by deformation of the body when the body is subjected to a torque, wherein the volume change causes a change of pressure of the enclosed gas in the gastight chamber. Advantageously, the torque is detected via a direct dimensional change of the torque sensor, which dimensional change in turn is recognized as a change of the pressure within the gastight chamber. This is more reliable and accurate than e.g. indirect detection via a strain gauge, where the adhesive is a less effective force transmitter.

Pressure sensors being sensitive, i.e. having a high resolution, are currently available. By providing a gastight chamber, which changes its volume when subjected to torque the change of torque is expressed as a change of pressure, as recognized by the ideal gas law, i.e. $PV=nRT$ where P is the pressure of the gas, V is the volume of the gas, n is the molar mass of the gas, R is ideal gas constant, and T is the temperature of the gas. The pressure is transformed to torque. Thereby, a torque value with high resolution and good accuracy has been achieved.

In accordance with an embodiment of the torque sensor the first gastight chamber is defined by a first chamber housing comprising a first main wall, which constitutes a portion of the body that comprises deformation enhancing portions, and which is arranged to change its measures when the body is subjected to the torque, thereby changing the volume of the gastight chamber. The deformation enhancing portions provide for larger changes of the volume for a certain torque, which further enhances the function of the torque sensor.

In accordance with an embodiment of the torque sensor, it additionally comprises a second gastight chamber defined by a second chamber housing comprising a second main wall, which constitutes a portion of the body that comprises deformation enhancing portions, and which is arranged to change its measures when the body is subjected to the torque, thereby changing the volume of the second gastight chamber, one of the first and second gastight chambers being arranged to increase its volume and the other being arranged to decrease its volume when the body is subjected to the torque, wherein the pressure sensor is arranged to measure a pressure difference between the first and the second gastight chambers. The differential structure is advantageous.

In accordance with an embodiment of the torque sensor, the deformation enhancing portions comprise grooves, wherein the torque sensor comprises an outer sleeve arranged coaxially with the body and covering the grooves, and wherein the first and second chamber housings further comprise respective portions of the sleeve covering the grooves.

In accordance with an embodiment of the torque sensor, the body comprises first and second end portions arranged to be connected with external devices, wherein the grooves consist of several interconnected mid-grooves, several interconnected first end grooves, and several interconnected second end grooves, wherein the mid-grooves are arranged equidistantly around the periphery of the centre portion and extend obliquely in one direction relative to a torque axis of the body, wherein the first and second end grooves extend obliquely in another direction relative to the torque axis, and are arranged equidistantly around the periphery of the centre portion at either end of the mid-grooves, such that the first end grooves are arranged between the first end portion and the mid-grooves, and the second end grooves are arranged between the second end portion and the mid-grooves, wherein the first gastight chamber comprises the mid-grooves, and wherein the second gastight chamber comprises a first sub-chamber comprising the first end grooves, and a second sub-chamber comprising the second end grooves. This division of the second gastight chamber reduces the sensitivity to different temperature at different portions of the torque sensor.

In accordance with an embodiment of the torque sensor, the length of each groove of said first and second end grooves is half of the length of each groove of said mid-grooves. Thereby, the volumes of the first and second gastight chambers is equal.

In accordance with an embodiment of the torque sensor, the deformation enhancing portions comprise grooves, wherein the torque sensor comprises an inner sleeve arranged coaxially with the body, wherein the inner sleeve is provided with several recesses at an outer surface of the sleeve, which recesses are longitudinally aligned with the grooves, and wherein the first and second chamber housings further comprise respective portions of the sleeve having respective recesses. In this embodiment the recesses of the inner sleeve provide a similar space as the grooves in the embodiment just mentioned above.

In accordance with an embodiment of the torque sensor, the body comprises first and second end portions arranged to be connected with external devices, wherein the grooves consist of several mid-grooves, several first end grooves, and several second end grooves, wherein the mid-grooves are arranged equidistantly around the periphery of the centre portion and extend obliquely in one direction relative to a torque axis of the body, wherein the first and second end grooves extend obliquely in another direction relative to the torque axis, and are arranged equidistantly around the periphery of the centre portion at either end of the mid-grooves, such that the first end grooves are arranged between the first end portion and the mid-grooves, and the second end grooves are arranged between the second end portion and the mid-grooves, wherein the recesses comprise several interconnected mid-recesses, which are longitudinally aligned with the mid-grooves, several interconnected first end recesses, which are longitudinally aligned with the first end grooves, and several interconnected second end recesses, which are longitudinally aligned with the second end grooves.

In accordance with an embodiment of the torque sensor, it comprises opposite first and second end portions arranged to be connected with external devices. The gastight chamber is positioned between the first and second end portions. The main wall defines a hollow portion of the body. The chamber housing comprises a lid closing an outer end of the main wall by means of an gastight attachment to the main wall. The structure of a hollow portion and a lid is a simple yet flexible structure for tailoring the gastight chamber.

In accordance with an embodiment of the torque sensor, it comprises first and second gastight chambers, where one of them is arranged to increase its volume and the other is arranged to decrease its volume when the body is subjected to the torque. The pressure sensor is arranged to measure a pressure difference between the first and the second gastight chamber. By providing a differential structure any common-mode interferences such as external axial forces and common temperature changes of the shaft are rejected. Additionally, it is possible to provide sense the direction of the torque in addition to its magnitude.

In accordance with an embodiment of the torque sensor, it comprises opposite first and second end portions arranged to be connected with external devices. The first and second gastight chambers are consecutively positioned between the first and second end portions. The main wall of each chamber housing comprises deformation enhancing portions, wherein the deformation enhancing portions comprise several grooves extending obliquely to a central torque axis of the torque sensor, which torque axis extends between the first and second end portions. Thereby, the sensitivity of the torque sensor is increased.

In accordance with an embodiment of the torque sensor, the main wall of each chamber housing is a cylindrical portion of the body, and the grooves are formed in an outer surface of the main wall. The respective grooves of the first and second gastight chambers extend in mutually different directions. These surface located grooves extending in different directions at the different gastight chambers is an advantageous implementation of providing the differential volume change of the gastight chambers.

In accordance with an embodiment of the torque sensor, each lid is cup shaped, having a tubular portion with an outer and an inner end, wherein the gastight attachment is at the outer end of the tubular portion, and having an end wall at the inner end of the tubular portion. Each chamber housing further comprises a wall portion at an inner end of the main wall, which wall portion is connected with the main wall and is positioned adjacent to the end wall, wherein a spacing, constituting at least a part of the gastight chamber, is provided between the lid and the main wall and the wall portion, respectively.

In accordance with an embodiment of the torque sensor, a surface of the tubular portion of the lid is provided with several recesses facing an inner surface of the main wall, and intermediate surface portions, which engage with the inner surface of the main wall. Thereby, the enclosed volume can be small and accurately adjustable. This embodiment is advantageous that the gas volume in the sensing structure of the torque sensor which is more vulnerable to ambient temperature changes can be minimized compared to the total gas volume of the gastight chamber, hence reducing the net effect of inaccuracy of the torque sensor caused by gas temperature difference between the chambers. The surface contact between the tubular portion of the lid and the inner surface of the main wall is also an advantageous implementation for improving thermal conductivity between the lid and main wall that surround the gas volume in the sensing structure of the torque sensor and hence reducing the effect of chamber volume change due to ambient temperature change. Furthermore, when the main wall is provided with grooves, as mentioned above, preferably the recesses of the lids are aligned with the grooves of the main wall, in order to optimize the responsivity to the dimensional changes due to the applied torque.

In accordance with an embodiment of the torque sensor, a surface of the end wall of each lid is provided with a plurality of elongated notches extending radially of the body, each notch being connected with a respective one of the recesses, wherein the torque sensor further comprises an intermediate cavity between the respective wall portions of the first and second chamber housings, wherein the first and second chamber housings comprise first and second chamber portions, respectively, arranged in the intermediate cavity, and being connected with the respective plurality of notches via a respective centre gas conduit extending through the respective wall portions. This is an advantageous implementation because most of the gas in the gastight chambers can be situated closely together in the first and second chamber portions to reduce the thermal resistance between themselves and hence the temperature difference between the chambers which can cause inaccuracy to the torque sensor. In accordance with an embodiment of the torque sensor, the first and second chamber portions are spaced from a surrounding outer wall portion of the body. Thereby a degree of thermal insulation to temperature changes of the body has been achieved. This thermal insulation can be further improved by inserting materials with low thermal conductivity into the gap space.

In accordance with an embodiment of the torque sensor, the first and second chamber housings are engaged with each other at an engagement portion, and wherein at least the engagement portion is made of a thermally conducting material. This embodiment advantageously reduces inaccuracy due to different gas temperatures within the chambers.

BRIEF DESCRIPTION OF THE DRAWINGS

The invention will now be described in more detail and with reference to the appended drawings in which:

FIG. 14 is an exploded view of the embodiment of FIG. 13.

DESCRIPTION OF EMBODIMENTS

Figure 1:
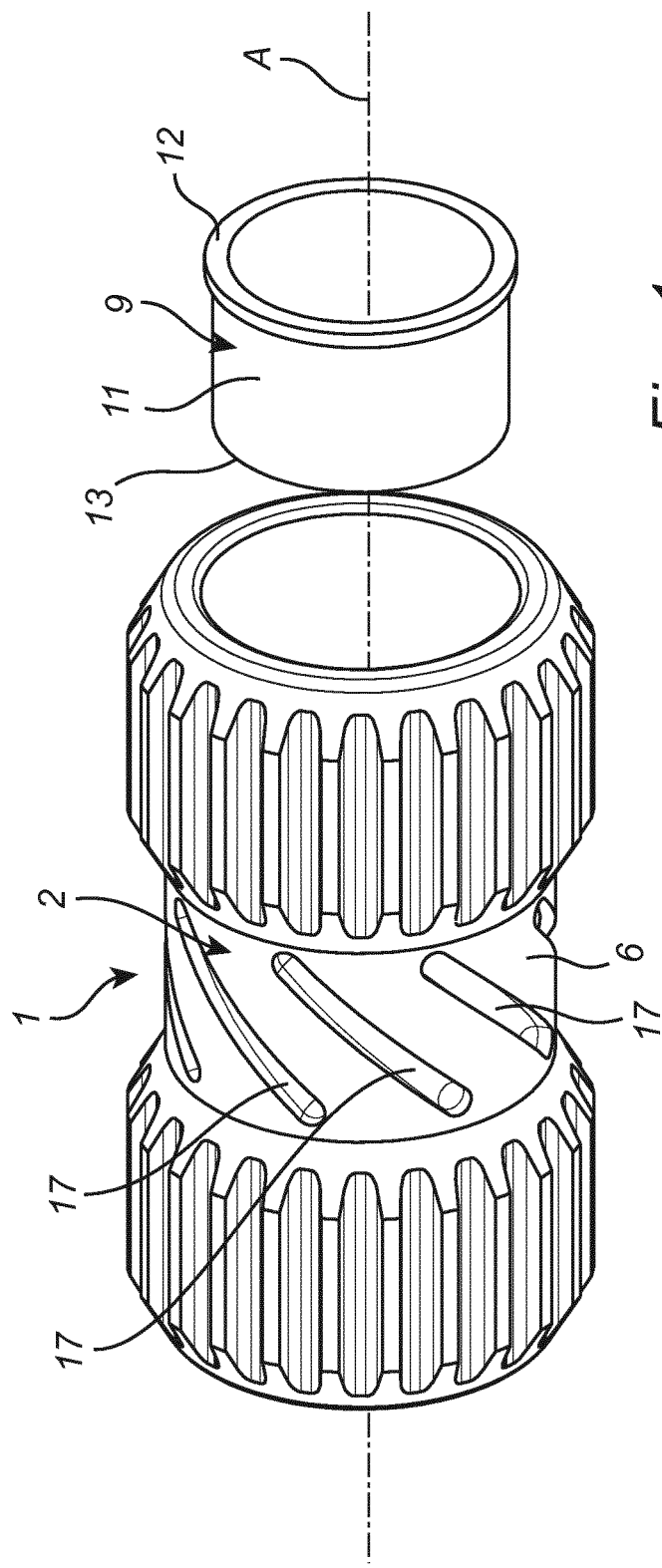
FIG. 1 is an exploded view of an embodiment of the torque sensor according to the present invention.
Figure 2:
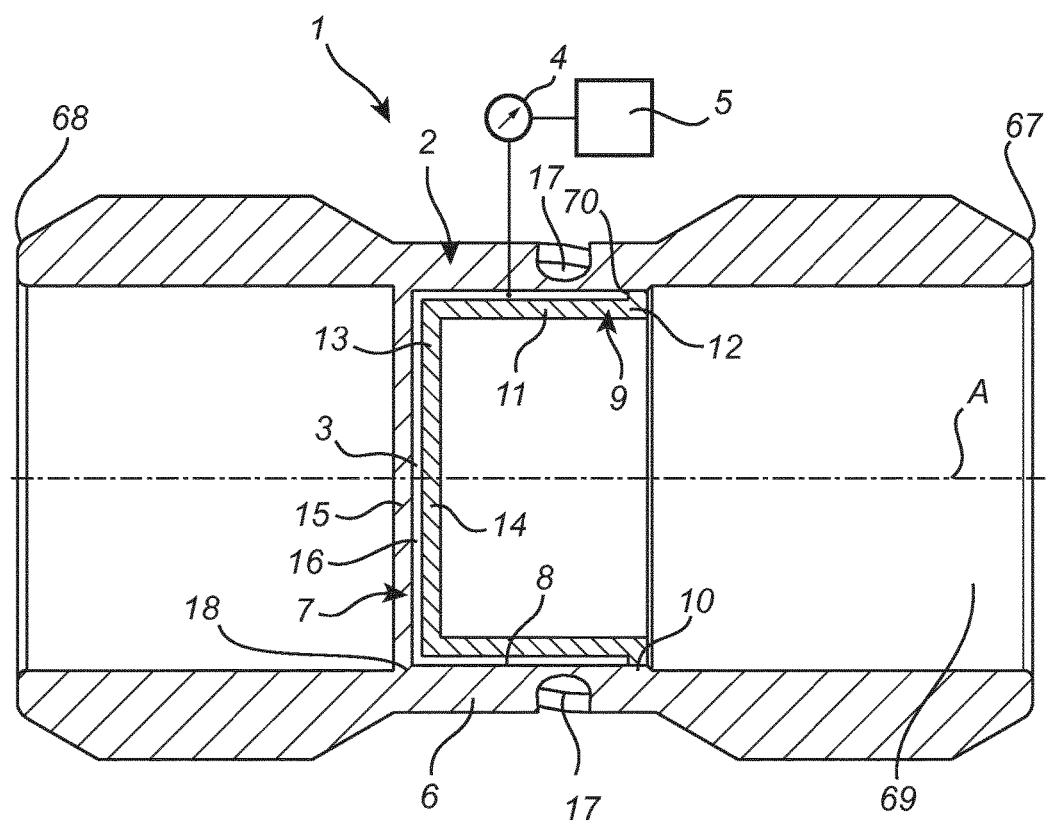
FIG. 2 is a cross-sectional view of the embodiment of FIG. 1.

In accordance with a first embodiment of the torque sensor as shown in FIGS. 1 and 2, the torque sensor 1 comprises a body 2, an airtight, or gastight, chamber 3 provided in the body 2, a pressure sensor 4 measuring the pressure in the airtight chamber 3, and a pressure to torque converter, or simply torque converter, 5 connected with the pressure sensor 4. This torque sensor 1 is based on the measurement of a volume change of the airtight chamber 3 created when torque-induced compressive or tensile stresses are applied onto parts or whole of the airtight chamber 3. In a typical application, the torque sensor 1 is shaft-mounted, i.e. it is mounted in, or constitutes a portion of, a shaft of a machinery. This is exemplified in FIG. 6, and will be further described below. More particularly, the torque sensor 1 has first and second end portions 67, 68, which are connected with external devices. Thus, when the shaft is subjected to a torque, such as by rotating a drive end of the shaft for driving a device connected with an opposite driven end of the shaft, the torque sensor 1 senses that torque by being slightly twisted. The measurement performed by the torque sensor 1 is based on the ideal gas law as mentioned above. The pressure sensor 4 connected to the airtight chamber 3 senses the pressure change of the gas inside of the airtight chamber 3 due to the volume change of the airtight chamber 3 under torque. The gas can be of any suitable type, but ordinary air is typically used. The terms gas and air are used as fully exchangeable equivalents, or synonyms, throughout this application.

The airtight chamber 3 is defined by a chamber housing 7 comprising a main wall 6. The main wall 6 constitutes a hollow portion 8 of the body 2, and defines a part of a central boring 69 that has been axially milled in the body 2, i.e. along a torque axis A, which is a longitudinal axis of the torque sensor 1. The main wall 6 is cylindrical. The chamber housing 7 further comprises a lid 9, which has been inserted in the body 2, i.e. in the central boring 69, and closes an outer end 10 of the main wall 6, by means of an airtight attachment to the main wall 6. For example, the airtight attachment, or seal, is constituted by an o-ring or by an adhesive, or is done by soldering, welding, shrink-fitting or any other suitable method available.

In this embodiment the lid 9 is cup shaped, and has a tubular portion 11 with an outer end 12 and an inner end 13. The airtight attachment is at the outer end 12 of the tubular portion 11, where the tubular portion 11 is provided with a rim 70, and the lid 9 has an end wall 14 at the inner end 13 of the tubular portion 11, which end wall 14 can be considered to be a bottom of the cup. In addition to the main wall 6 and the lid 9, the chamber housing 7 comprises a wall portion 15 at an inner end 18 of the main wall 6 in parallel with the end wall 14. Thus, the wall portion 15 extends perpendicularly to the torque axis A. The boring 69 would have been a through hole if not for the wall portion 15. A clearance 16 is provided between the lid 9 and the main wall 6 and the wall portion 15, respectively, and more particularly between, on one hand, the tubular portion 11 and the main wall 6, and on the other hand, between the end wall 14 and the wall portion 15. The width of the clearance 16 between the tubular portion 11 and the inner surface of the main wall 6 corresponds to the height of the rim 70, and is small relative to the inner diameter of the main wall. The width of the clearance 16 between the end wall 14 and the wall portion 15 is the same. A non-limiting example of the width of the clearance is 0.5 mm with an inner diameter of the main wall 6 of 40 mm, a total length of the chamber 3 of 25 mm, and a total air volume in the chamber 3 of about 1.5 cm$^3$. The pressure sensor 4 is mounted preferably out of the airtight chamber 3 but nearby. A non-limiting example is on the bottom of the lid 9, at the torque axis A, inside the cup space created by the lid 9. A preferred connection location and method between the airtight chamber 3 and the pressure sensor 4 is a small drill hole opening at the center of the end wall 14 of the lid 9 on the torque axis A. The torque converter 5 receives the pressure as input from the pressure sensor 4, and calculates the corresponding torque. The torque converter 5 for instance is an external computing device with a display, and it is preferably wirelessly connected with the pressure sensor 4 by either inductive coupling or RF communication.

As is evident from the ideal gas law mentioned above the pressure P and the volume V of the gas are inverse proportional to each other when the temperature T is constant, which means that if the volume of the gas chamber increases, then the gas pressure reduces, and vice versa. By measuring the pressure change of the gas inside the airtight chamber 3, the volume change of the airtight chamber 3 can be calculated, and hence the applied torque on the shaft can be derived, according to the equation $T=k\Delta P$, where T is the applied torque, k is a sensitivity constant that is depended on both the material and the geometry of the sensing structure of the torque sensor, and $\Delta P$ is the pressure change measured by the pressure sensor of the gas inside the chamber due to the applied torque Preferably, the main wall 6 comprises deformation enhancing portions 17. The deformation enhancing portions 17 are grooves, which have been milled in the outer surface of the main wall 6. The grooves 17 are equidistantly positioned around the periphery of the main wall 6. The grooves 17 extend obliquely to the torque axis A, and causes an additional deformation of the airtight chamber 3 compared to an embodiment lacking the grooves 17 when subjected to equal torque. Preferably the angle to the torque axis A is 45 degrees but a rather wide interval of angles can be applied. The angle also provides a possibility to detect the direction of rotation, which is useful in some applications of the torque sensor 1. The airtight chamber 3 becomes smaller when twisting the torque sensor 1, and more particularly its body 2 in one direction, and larger when twisting it in the other direction.

Figure 3:
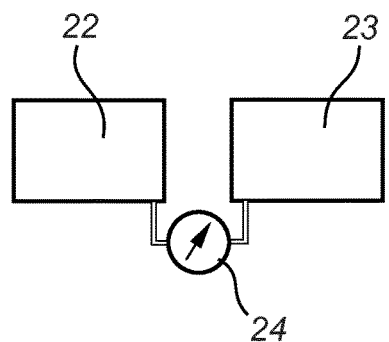
FIG. 3 is a block diagram of an embodiment of the torque sensor according to the present invention.
Figure 4:
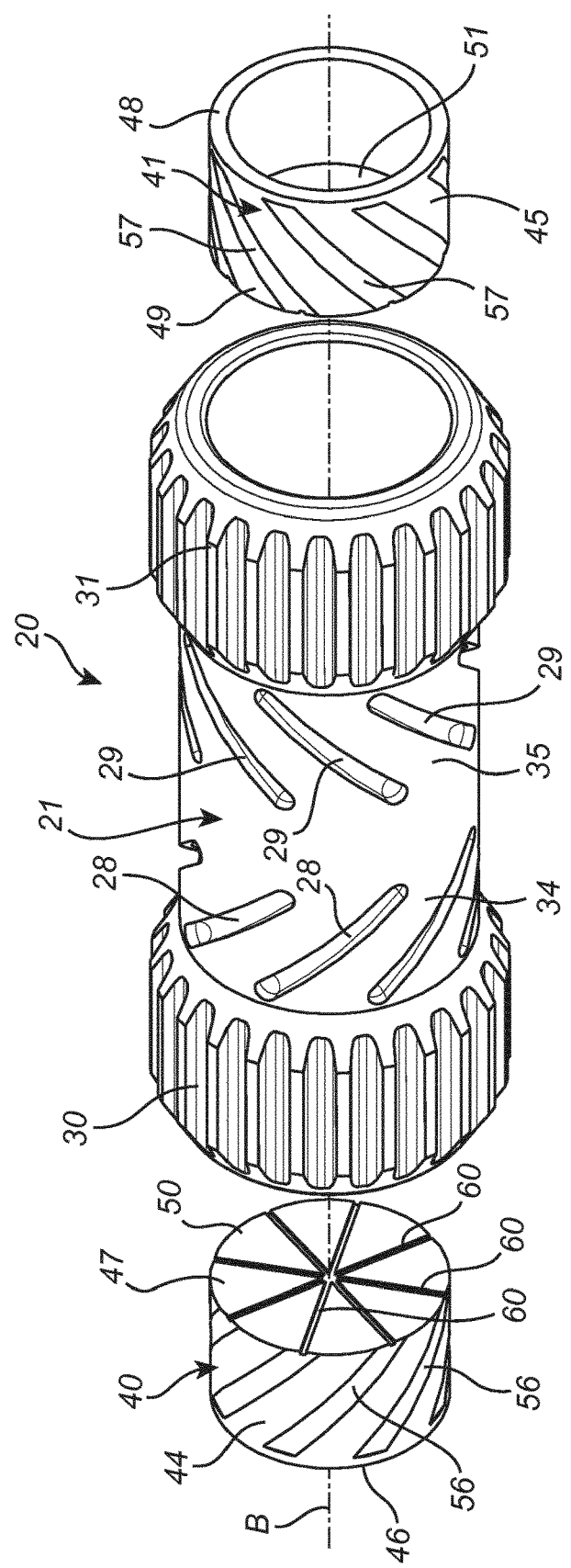
FIG. 4 is an exploded view of the embodiment of FIG. 3.
Figure 5:
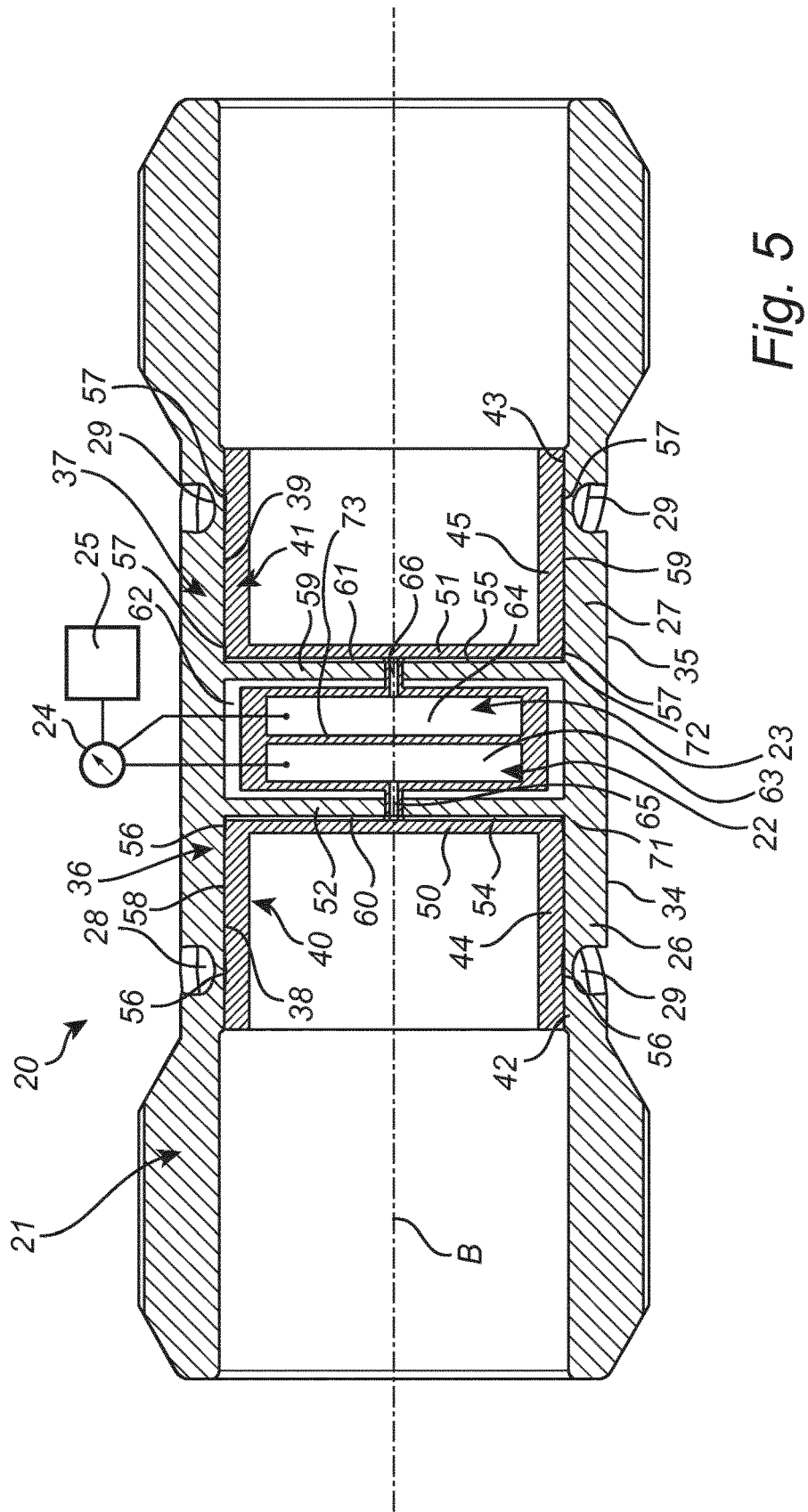
FIG. 5 is a cross-sectional view of the embodiment of FIG. 4.

In order to achieve a differential design which is beneficial to reject common-mode interferences such as external axial forces and common temperature changes of the shaft, two gas chambers with identical volumes can be created in the same shaft, and these gas chambers can be designed to deform differently under the same torque, such that one reduces volume and the other increases volume. For this purpose, a second embodiment of the torque sensor 20 is designed as follows, as shown in FIGS. 3-5.

Figure 6:
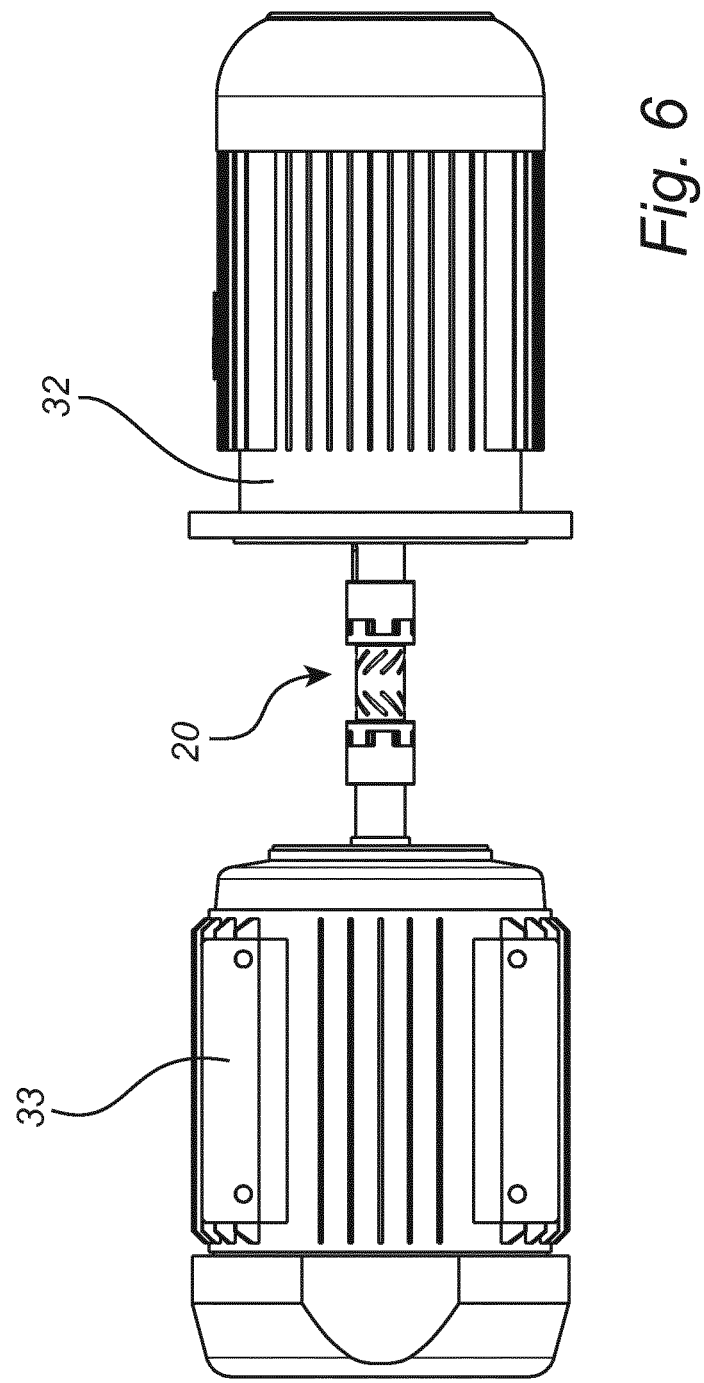
FIG. 6 is a side view showing an example of a use of the torque sensor.

The torque sensor 20 comprises a body 21, a first airtight chamber 22, and a second airtight chamber 23. One of the first and second airtight chambers 22, 23 is arranged to increase its volume and the other is arranged to decrease its volume when the body 21 is subjected to the torque, and thereby is being twisted. In this embodiment, the pressure sensor 24 is arranged to measure a pressure difference between the first and the second airtight chambers 22, 23. Thus, the torque converter 25 converts the pressure difference to a corresponding torque. Opposite first and second end portions 30, 31 are arranged to be connected with external devices 32, 33, as shown in FIG. 6. The first and second airtight chambers 22, 23 are consecutively positioned between the first and second end portions 30, 31. The first and second airtight chambers 22, 23 are defined by a first chamber housing 36 and second chamber housing 37, respectively, each comprising a main wall 26, 27, also denote first and second main walls, respectively. The main wall 26, 27 of each chamber housing 36, 37 comprises deformation enhancing portions 28, 29, which are constituted by several grooves 28, 29 extending obliquely to a central torque axis B. More particularly, the main wall 26, 27 of each chamber housing 36, 37 is a cylindrical portion of the body 21, and the grooves 28, 29 are formed in an outer surface 34, 35 of the main wall 26, 27, like in the first embodiment, and they are equidistantly positioned around the periphery of the main wall 26, 27. However, the respective grooves 28 and 29 of the first and second chamber housings 36, 37 extend in mutually different directions. For instance, the grooves 28 of the first chamber housing 36 extends +45 degrees to the torque axis B, while the grooves 29 of the second chamber housing 37 extend −45 degrees to the torque axis B.

Thereby a pressure difference which is proportional both to the direction and to the magnitude of the applied torque can be measured by means of the differential gas pressure sensor 24. The anisotropy between the two airtight chambers 26, 27 required for this differential design can be created by different methods, but the method proposed here, i.e. milling the grooves 28, 29, which can also be called spiral slits, of opposite angles at the outside of both chamber housings 36, 37, is a simple way of doing it. The choice of ±45° angles in relation to the torque axis maximizes the volume change of the airtight chambers 22, 23 to the applied torque.

Each one of the first and second main walls 26, 27 constitutes a hollow portion 38, 39 of the body 21, similar to the first embodiment. Each of the first and second chamber housings 36, 37 further comprises a lid 40, 41 closing an outer end 42, 43 of the main wall 26, 27 by means of an airtight attachment to the main wall 26, 27. Consequently, the first and second chamber housings 36, 37 are mirrored.

Each lid 40, 41 is cup shaped, like in the first embodiment, and has a tubular portion 44, 45 with an outer end 46, 48, and an inner end 47, 49. The airtight attachment is at the outer end 46, 48 of the tubular portion 44, 45, and an end wall 50, 51 is provided at the inner end 47, 49 of the tubular portion 44, 45. Each chamber housing 36, 37 further comprises a wall portion 52, 53 at an inner end 71, 72 of the hollow portion 38, 39, which wall portion 52, 53 is connected with the main wall 26, 27 and is positioned adjacent to the end wall 50, 51 of the lid 40, 41. A spacing 54, 55 constituting a part of the airtight chamber 22, 23 is provided between the lid 40, 41 and the main wall 26, 27 and between the lid 40, 41 and the wall portion 52, 53, respectively.

A surface, which can be called a peripheral surface, of the tubular portion 44, 45 of the lid 40, 41 is provided with several recesses 56, 57 facing an inner surface of the main wall 26, 27, and intermediate surface portions 58, 59, which engage with the inner surface of the main wall 26, 27. The lids 40, 41 have typically been shrink-fitted, and thereby the respective mating surfaces of the lids 40, 41 and the main walls 26, 27 are stressed after the shrink-fitting assembly. This ensures that the lids 40, 41 accurately follow the dimensional movements of the main walls 26, 27, and an even better stability against thermal expansion induced pressure error on the recesses 56, 57 is achieved. The recesses 56, 57 are aligned with the grooves 28, 29 of the adjacent main walls 26, 27. The alignment improves the deformation sensitivity of the torque sensor 20.

A surface of the end wall 50, 51 of each lid 40, 41 is provided with a plurality of elongated notches 60, 61 extending radially of the body 21. Each notch is connected with a respective one of the recesses 56, 57. Together they form a minor portion of the airtight chamber 22, 23. The torque sensor 20 further comprises an intermediate cavity 62 between the respective wall portions 52, 53 of the first and second chamber housings 36, 37. The first and second chamber housings 36, 37 comprise first and second chamber portions 63, 64, respectively, arranged in the intermediate cavity 62. The first and second chamber portions 63, 64 each constitutes a major portion of its respective chamber 22, 23 and is interconnected with the respective minor portion. More particularly, the respective first and second chamber portions 63, 64 are connected with the respective plurality of notches 60, 61 via a respective centre gas conduit 65, 66 extending through the respective wall portions 52, 53. In other words, each airtight chamber 22, 23 has a minor portion and a major portion, which are interconnected via a centre gas conduit.

Furthermore, the first and second chamber portions 63, 64 are spaced from a surrounding outer wall portion of the body 21, which outer wall portion in conjunction with the wall portions 52, 53 defines the intermediate cavity 62.

The pressure sensor 24 is connected with the first and second chamber portions 63, 64 and is arranged to measure a pressure difference between them. The first and second chamber housings 36, 37 are engaged with each other at an engagement portion, here constituting a common chamber end wall 73, or partitioning wall, which consequently separates the first chamber portion 63 from the second chamber portion 64. At least the engagement portion is preferably, but not necessarily, made of a thermally well conducting material, such as copper or aluminium. Furthermore, the engagement portion 73 is thermally insulated from the outer wall portion of the body 21 by a gap between them, which can be filled with air or some other gas or yet another kind of insulation material. This is advantageous since ambient temperature fluctuation and a temperature gradient possibly occurring between the airtight chambers 22, 23 could induce errors to the torque sensor 20. One error is from the differential volume change between the two airtight chambers 22, 23 due to thermal expansion of the chamber structure. Another error is from the differential pressure caused by the temperature difference of the air itself. The relatively small size of the airtight chambers in general, and of the minor portions of the airtight chambers in particular contribute to minimizing thermal errors as well.

In order to further exemplify the dimensions of the airtight chamber and the resolution of the torque sensor, in one implementation, the torque sensor according to the second embodiment had a sensing range of ±2000 Nm. The range of the pressure sensor was ±250 Pa, and its resolution was $\frac{1}{10000}$ of the full scale, that is ±0.025 Pa. The volume of each combination of a recess and a notch, was about 8 mm$^3$. Each airtight chamber had 8 recesses. The volume of each major chamber portion in the intermediate cavity was: about 733 mm$^3$. The total volume of each airtight chamber was about 800 mm$^3$. The initial air pressure in the airtight chambers was 101325 Pa, corresponding to nominal air pressure at sea level. The volume change of each combination of a recess and a notch of the first airtight chamber at a torque of 2000 Nm was 1 mm$^3$, and the volume change of each combination of a recess and a notch of the second airtight chamber was −1 mm$^3$. The volume change induced pressure change in the first airtight chamber was −125 Pa, and +125 Pa in the second airtight chamber. Consequently, the total pressure difference was 250 Pa.

Figure 7:
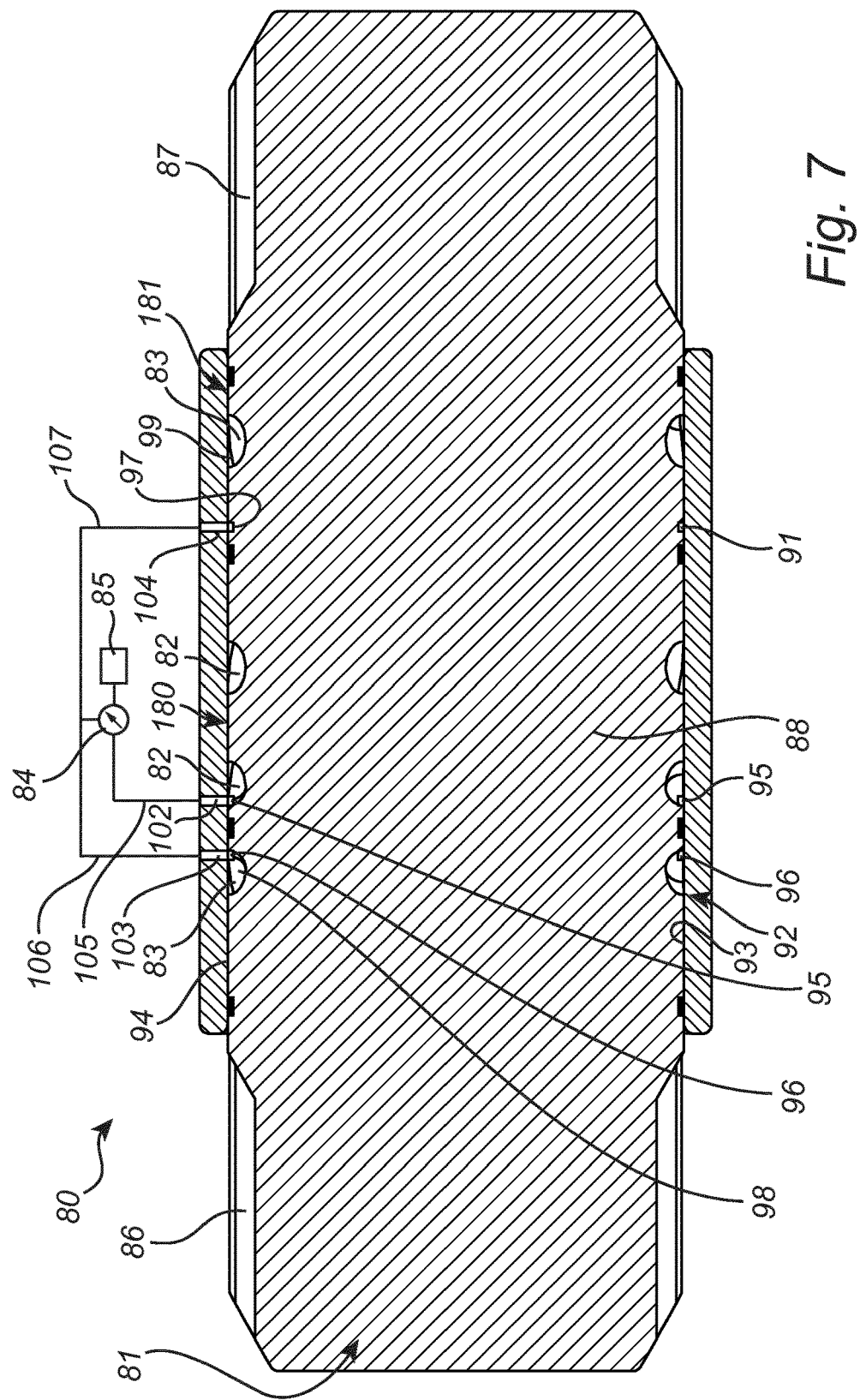
FIG. 7 is a cross-sectional view of an embodiment of the torque sensor according to the present invention.
Figure 8:
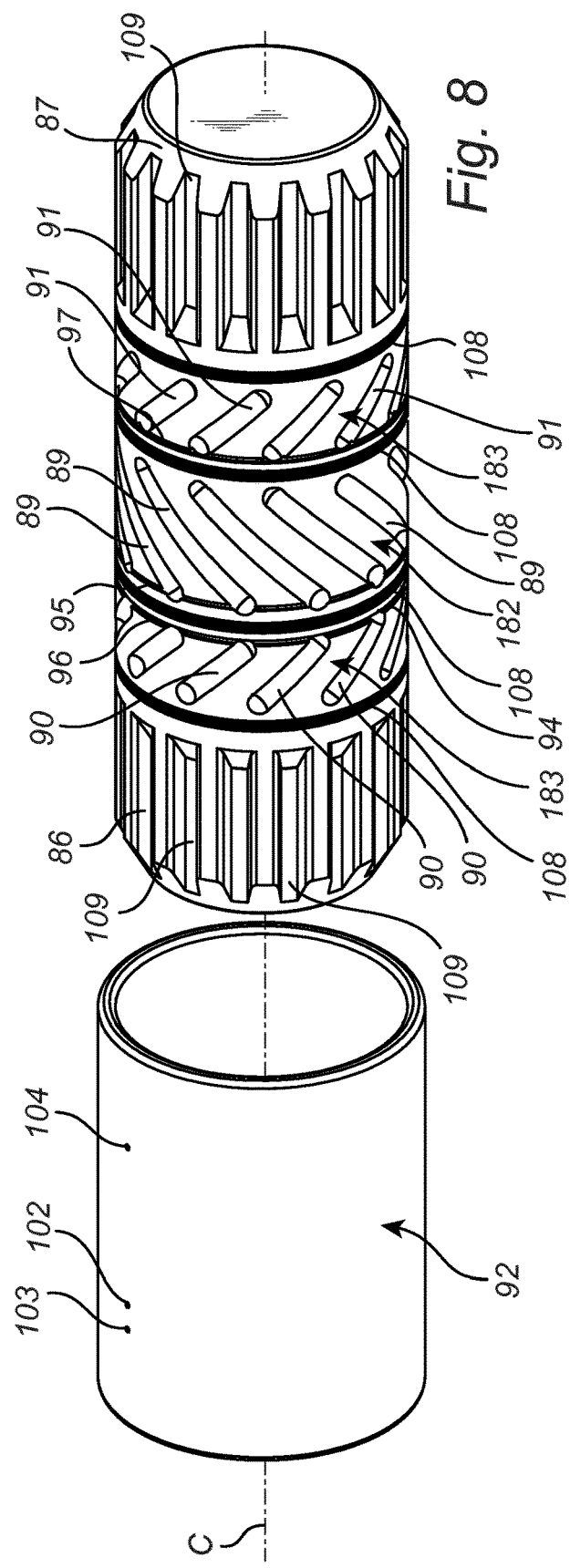
FIG. 8 is an exploded view of the embodiment of FIG. 7.

According to a third embodiment of the torque sensor 80, shown in FIGS. 7 and 8, it comprises a body 81, a first gastight, and thus airtight, chamber 82, and a second airtight chamber 83. The body is however preferably, but not necessarily, solid in this third embodiment. One of the first and second airtight chambers 82, 83 is arranged to increase its volume and the other is arranged to decrease its volume when the body 81 is subjected to the torque, and thereby is being twisted. Like in the second embodiment, a pressure sensor 84 is arranged to measure a pressure difference between the first and the second airtight chambers 82, 83, and a torque converter 85 converts the pressure difference to a corresponding torque. Opposite first and second end portions 86, 87 of the body 81 are arranged to be connected with external devices like in the previous embodiments. The first and second airtight chambers 82, 83 are consecutively positioned at a centre portion 88 of the body 81 between the first and second end portions 86, 87. The centre portion 88 is cylindrical and has an outer surface 94, at which it is provided with deformation enhancing portions constituted by grooves 89, 90, 91. The torque sensor 80 further comprises a sleeve 92, which has been mounted coaxially of the centre portion 88 outside thereof, and covers the grooves 89, 90, 91. The first and second airtight chambers 82, 83 are defined by first and second chamber housings 180, 181. Each chamber housing 180, 181 generally comprises a main wall 182, 183, which constitutes a portion of the body 81 that comprises the respective grooves 89-91, and a portion of the sleeve 92.

More particularly, the grooves 89-91 consist of several mid-grooves 89 and several end grooves 90, 91, which can be regarded as three sets of grooves. The mid-grooves 89 extend obliquely in one direction relative to the longitudinal direction of the body 81, and thus relative to the torque axis C. The mid-grooves 89 are arranged equidistantly around the periphery of the centre portion 88. The end grooves 90, 91 extend obliquely in another direction relative to the torque axis C, and are arranged equidistantly around the periphery of the centre portion 88 at either end of the mid-grooves 89. Thus, the end grooves 90, 91 contain first end grooves 90 arranged between the first end portion 86 and the mid-grooves 89, and second end grooves 91 arranged between the second end portion 87 and the mid-grooves 89.

In other words, the mid-grooves extend at a first angle to the torque axis C, and the end grooves extend at a second angle to the torque axis, where one of the first and second angles is positive, and the other is negative. Preferably the first and second angles are ±45°, as mentioned above for the grooves of the second embodiment. The mid-grooves 89 are interconnected by means of a mid-notch extending peripherally around the centre portion 88, i.e. around its outer surface 94. Similarly, the first end grooves 90 are interconnected by means of a first end notch 96, and the second end grooves 91 are interconnected by means of a second end notch 97, wherein the first and second end notches extend peripherally of the outer surface 94 as well. Thus, to be precise, the mid-grooves 89 and the mid-notch 95 form the first airtight chamber 82 together with a mid-portion of the inner surface 93 of the sleeve 92 covering them, i.e. serving as a lid. The first end grooves 90 and the first end notch 96 together with a first end portion of the inner surface 93 form a first sub-chamber 98 of the second airtight chamber 83, and the second end grooves 91 and the second end notch 97 together with a second end portion of the inner surface 93 form a second sub-chamber 99 of the second airtight chamber 83. The first and second sub-chambers 98, 99 of the second airtight chamber 83 are not physically interconnected in the body 81 but interconnected at the pressure sensor 84 or by an interconnection of gas conduits 100, 101 extending from the first and second sub-chambers 98, 99 to the pressure sensor 84. The sleeve 92 is provided with a first through hole 102, extending radially through the wall of the sleeve 92 into the first airtight chamber 82, and second and third through holes 103, 104 entering the first and second sub-chambers 98, 99, respectively, of the second airtight chamber 83. A first gas conduit 105 extends between the first through hole 102 and the pressure sensor 84, and second and third gas conduits 106, 107 extend from the second and third through holes 103, 104, respectively, and are interconnected before reaching the pressure sensor 84. The length of each groove of the first and second end grooves 90, 91 is about half the length of each mid-groove 89. The number of grooves around the periphery of each group of grooves is the same, and thereby the total gas volume of the first airtight chamber 82 is approximately equal to the total gas volume of the second airtight chamber 83.

The sleeve, 92 is tightly mounted on the body 81, for example by means of with shrink fitting or press fitting, such that there is no relative movement between the sleeve 92 and the body 81. However, to ensure the gastightness, preferably and additionally, peripheral sealing rings 108 are arranged between the respective first and second end grooves 90, 91 and the mid-grooves 89, and also between the first and second end grooves 90, 91 and the first and second end portions 86, 87, respectively. Thus, the sealing rings 108 are squeezed between the body 81 and the sleeve 92.

When the external devices cause a torque on the torque sensor 80, and thereby cause the torque sensor 80 to slightly twist, i.e. to deform, the first and second end grooves 90, 91 change their sizes in one way and the mid-grooves 89 change their sizes in the opposite way. In other words, if the first and second end grooves 90, 91 are lengthened, then the mid-grooves 89 are shortened, and vice versa. Thereby the volumes of the first and second airtight chambers 82, 83 are changed in a correspondingly opposite way causing a pressure difference between them which is detected by the pressure sensor 84. Since the volumes of the chambers are small it is an advantage to generate a differential change compared to the use of a single chamber. Furthermore, in comparison with the first and second embodiments this third embodiment of the torque sensor 80 is simpler to manufacture and assemble.

Figure 9:
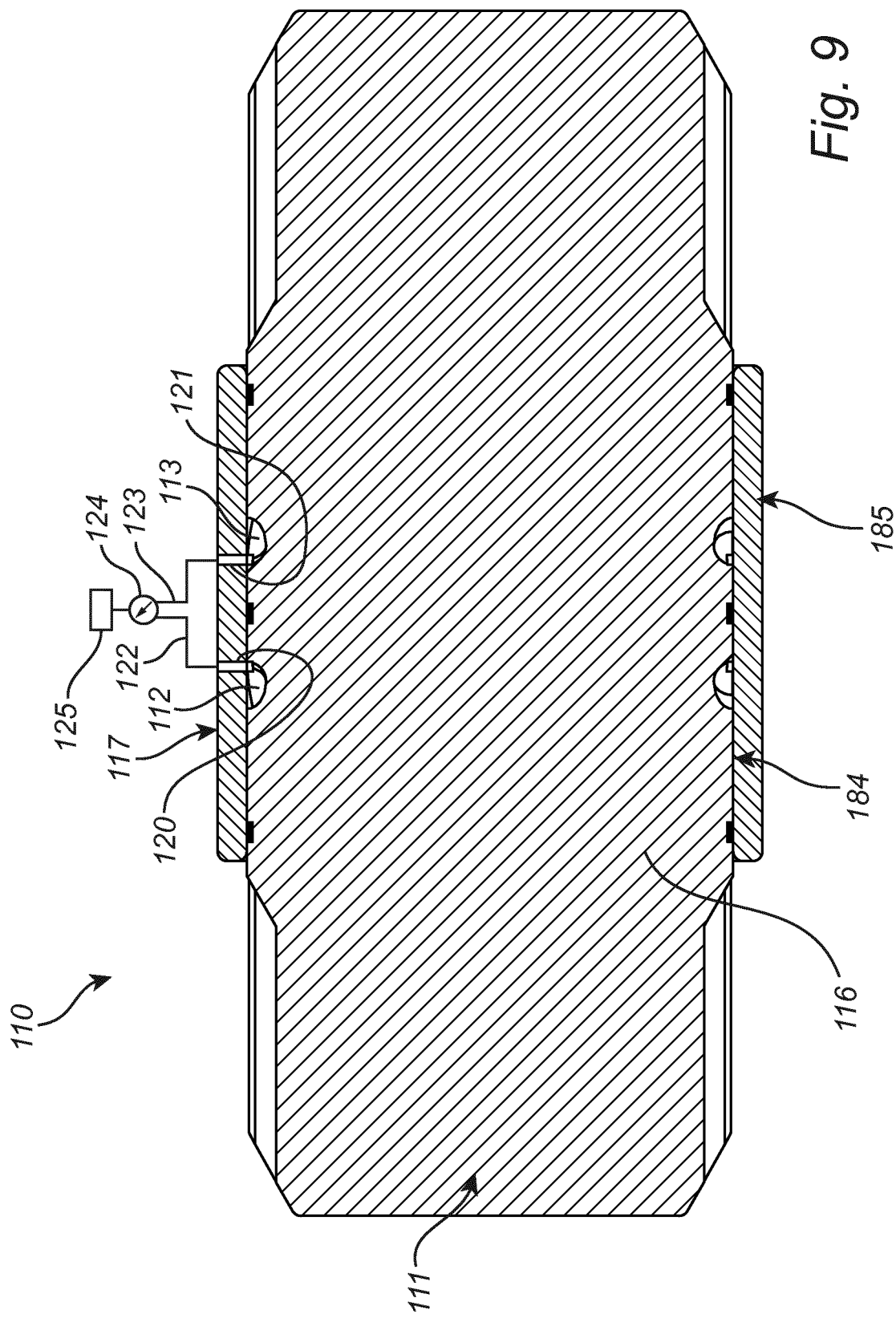
FIG. 9 is a cross-sectional view of an embodiment of the torque sensor according to the present invention.
Figure 10:
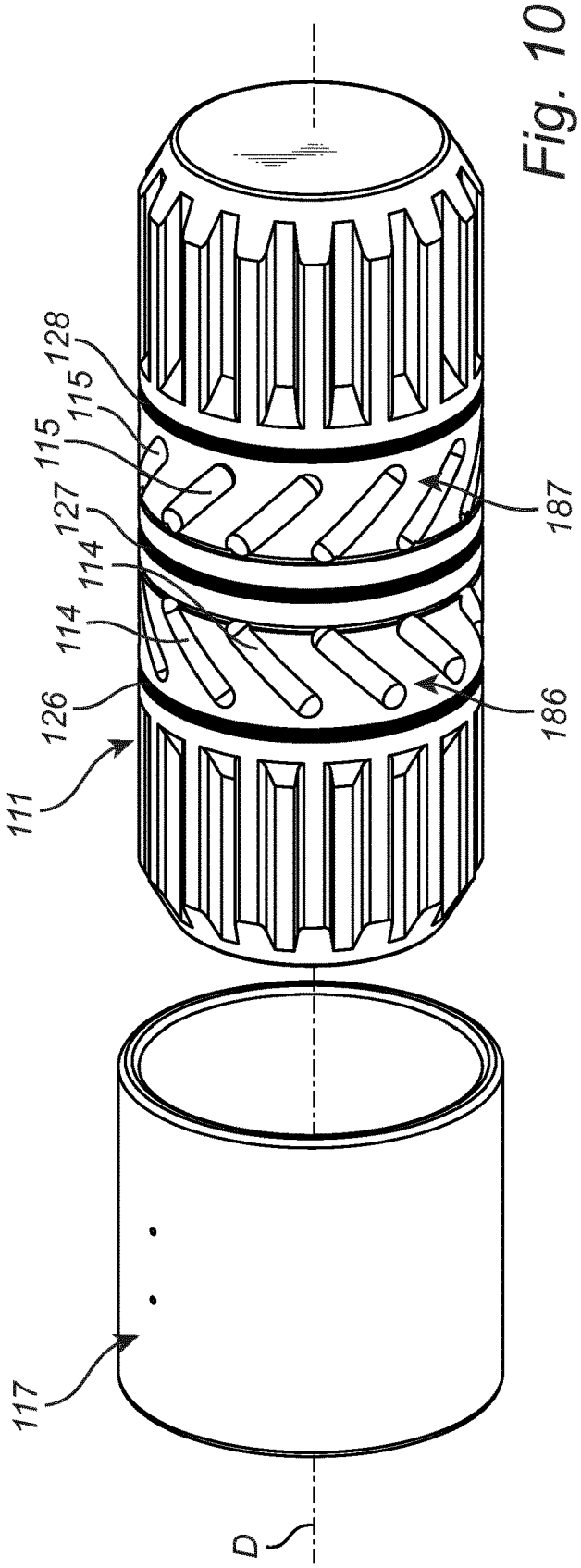
FIG. 10 is an exploded view of the embodiment of FIG. 9.

A fourth embodiment of the torque sensor 110 is shown in FIGS. 9 and 10. The fourth embodiment resembles the third embodiment. The major difference is that there are two groups of grooves instead of three groups of grooves. Thus, the torque sensor 110 comprises a body 111, a first airtight chamber 112, and a second airtight chamber 113. Several first grooves 114, and several second grooves 115 are arranged around the periphery of a centre portion 116 of the body 111, like in the third embodiment, where the first and second grooves 114, 115 extend in mutually different directions relative to the torque axis D. The first and second grooves 114, 115 are arranged adjacent to each other, and consecutively along the body 111. A sleeve 117 covers the grooves 114, 115. The first and second airtight chambers 112, 113 are defined by first and second chamber housings 184, 185. Each chamber housing 184, 185 generally comprises a main wall 186, 187, which constitutes a portion of the body 111 that comprises the respective grooves 114, 115, and a respective portion of the sleeve 117.

A first peripheral notch 118 interconnects the first grooves 114, and a second peripheral notch 119 interconnects the second grooves 115, like the notches 95-97 in the third embodiment. There are two through holes 120, 121 in the sleeve 117 which extend into the first and second airtight chambers 112, 113, and a respective gas conduit 122, 123 connected to the through hole 120, 121 at one end and to the pressure sensor 124 at the other end. In this embodiment as well, a torque converter 125 converts the differential pressure value to a corresponding torque value. Three sealing rings 126, 127, 128 extending around the periphery of the body 111 are arranged to ensure the sealing of the first and second airtight chambers 112, 113, one sealing ring 127 between the airtight chambers 112, 113 and the other 126, 128 at either side of the airtight chambers 112, 113.

Figure 11:
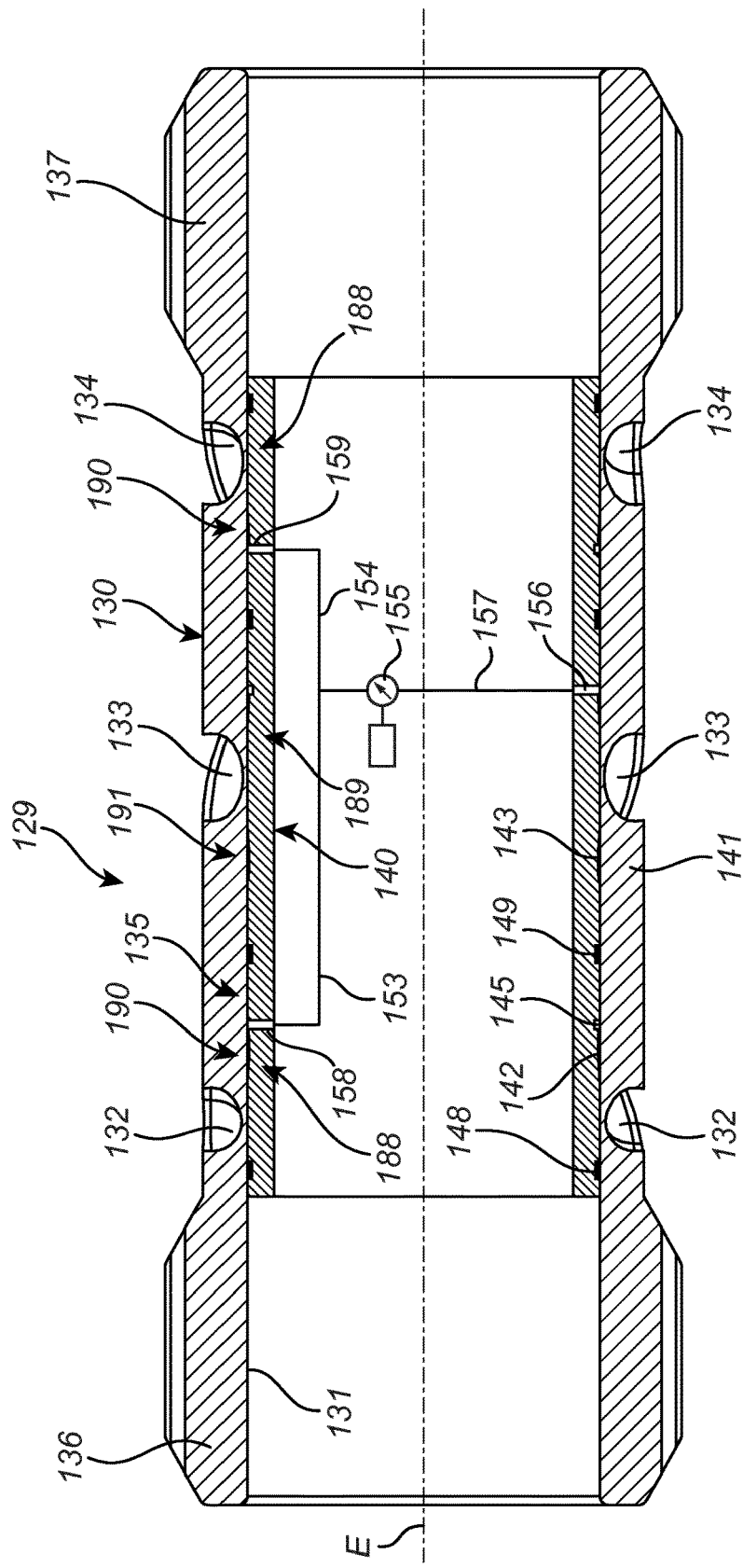
FIG. 11 is a cross-sectional view of an embodiment of the torque sensor according to the present invention.
Figure 12:
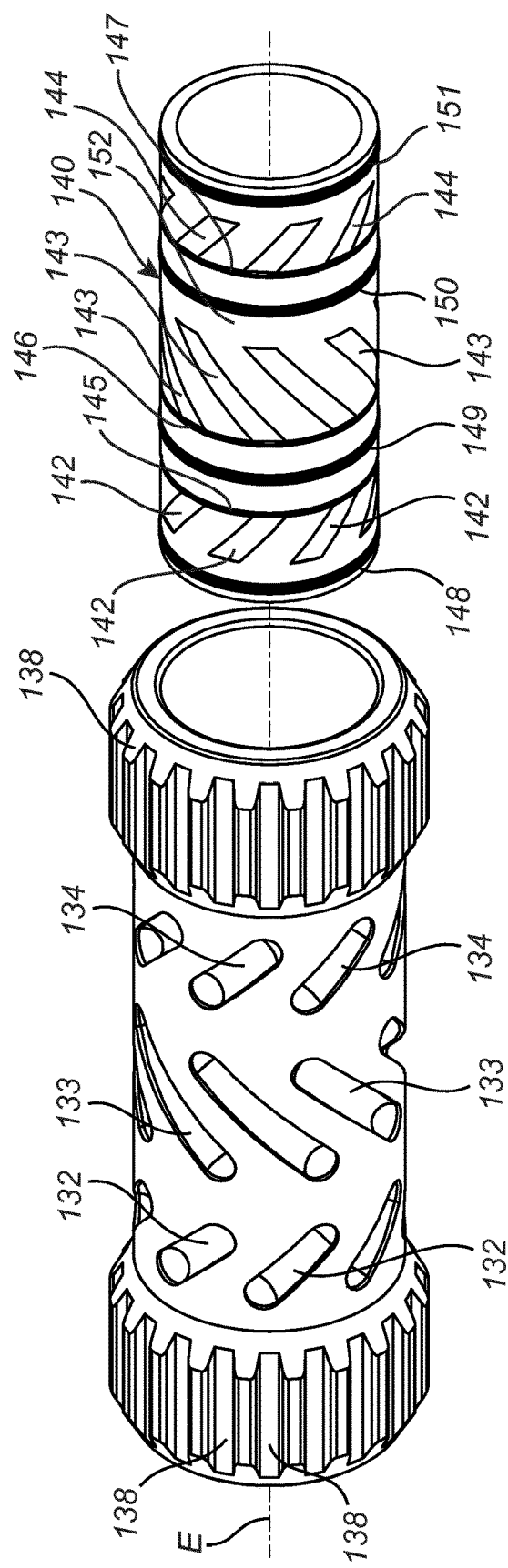
FIG. 12 is an exploded view of the embodiment of FIG. 11.

According to a fifth embodiment of the torque sensor 129, shown in FIGS. 11 and 12, it comprises a hollow body 130, like the first and second embodiments, though having a fully through boring defined by a smooth inner surface 131 of the body 130. Furthermore, the body 130 has an outer surface 135 being provided with three sets of grooves 132, 133, 134 at a centre portion of the body 130, which are denoted mid-grooves 133, first end grooves 132, and second end grooves 134. The sets of grooves 132-134 are shaped and arranged similarly to the sets of grooves 89-91 of the third embodiment. In other words, the mid-grooves 133 are arranged at the middle of the body 130 from a longitudinal perspective, and they are peripherally and equidistantly distributed around the outer surface 135 of the body 130. Furthermore, the mid-grooves 133 extend obliquely at a first angle to a longitudinal axis, or torque axis, E of the torque sensor 129. The first and second end grooves 132, 133 are arranged at the sides of the mid-grooves 133, i.e. between the mid-grooves 133 and a first end portion 136 of the body 130, and between the mid-grooves 133 and a second end portion 137 of the body 130, respectively.

Like in the other embodiments, the end portions 136, 137 are provided with connection members, such as cogs 138 or recesses 109, see FIG. 8, for connecting them with external devices. The first and second end grooves 132, 134 are similarly peripherally and equidistantly distributed around the outer surface 135 of the body 130, and extend at an opposite angle to the torque axis compared to the mid-grooves. That is, if the mid-grooves extend at an angle of +a degrees, the first and second end grooves 132, 134 extend at an opposite angle of −a degrees. Each first and second end groove 132, 134 has a length which is half of the length of each mid-groove 133. As in all embodiments having two airtight chambers, though, the size of the angles may differ, as long as they have different signs, such as angles +30° and −45°.

Furthermore, according to this fifth embodiment the torque sensor 129 comprises an inner sleeve 140, which has been inserted into the body 130 and which extend coaxially of a cylindrical centre portion 141 of the body 130 having the grooves 132-134 on its outside. The sleeve 140 is in engagement with the inner surface 131 of the body 130. The sleeve 140 is provided with three sets of recesses 142, 143, 144, which are longitudinally aligned with the sets of grooves 132-134. Each set of recesses 142-144 contain several recesses 142-144, which are radially adjacent to the grooves 132-134 of the body 130. The recesses 142-144 are elongated and extend obliquely to the torque axis, at the same angles as the adjacent grooves 132-134 of the body 130. The recesses 142-144 of each set of recesses 142-144 are interconnected with a respective peripheral notch 145-147. The sets of recesses 142-144 are separated by peripheral sealing rings 148-151 like the sets of grooves of the third embodiment. However, in this fifth embodiment the sealing rings 148-151 are arranged between an outer surface 152 of the sleeve and the inner surface 131 of the hollow body 130, and thereby first and second airtight chambers have been formed between the sleeve and the body 130. The first airtight chamber is constituted by two sub-chambers respectively comprising the spaces of the first and second end recesses 142, 144 and their notches 145, 147. The sub-chambers are interconnected by means of interconnected first and second gas conduits 153, 154 connected to through holes 158, 159 of the sleeve 140 and to a pressure sensor 155. The through holes 158, 159 enters one sub-chamber each. The mid-recesses 143 are connected with the pressure sensor 155 via a third through hole 156 by means of a third gas conduit 157.

The first and second airtight chambers are defined by first and second chamber housings 188, 189. Each chamber housing 188, 189 generally comprises a main wall 190, 191, which constitutes a portion of the body 130 that comprises the respective grooves 132-134, and a portion of the sleeve 140. Thus, when the torque sensor 129 is subjected to a torque from the external devices it is twisted, and so is the inner sleeve 140, since it is engaged with the body 130 in a fixed position relative to the body 130. That causes the volume of one of the first and second airtight chambers to increase and the volume of the other to decrease, causing differential pressure changes. The pressure changes add to a total pressure difference which is detected by the pressure sensor 155.

Figure 13:
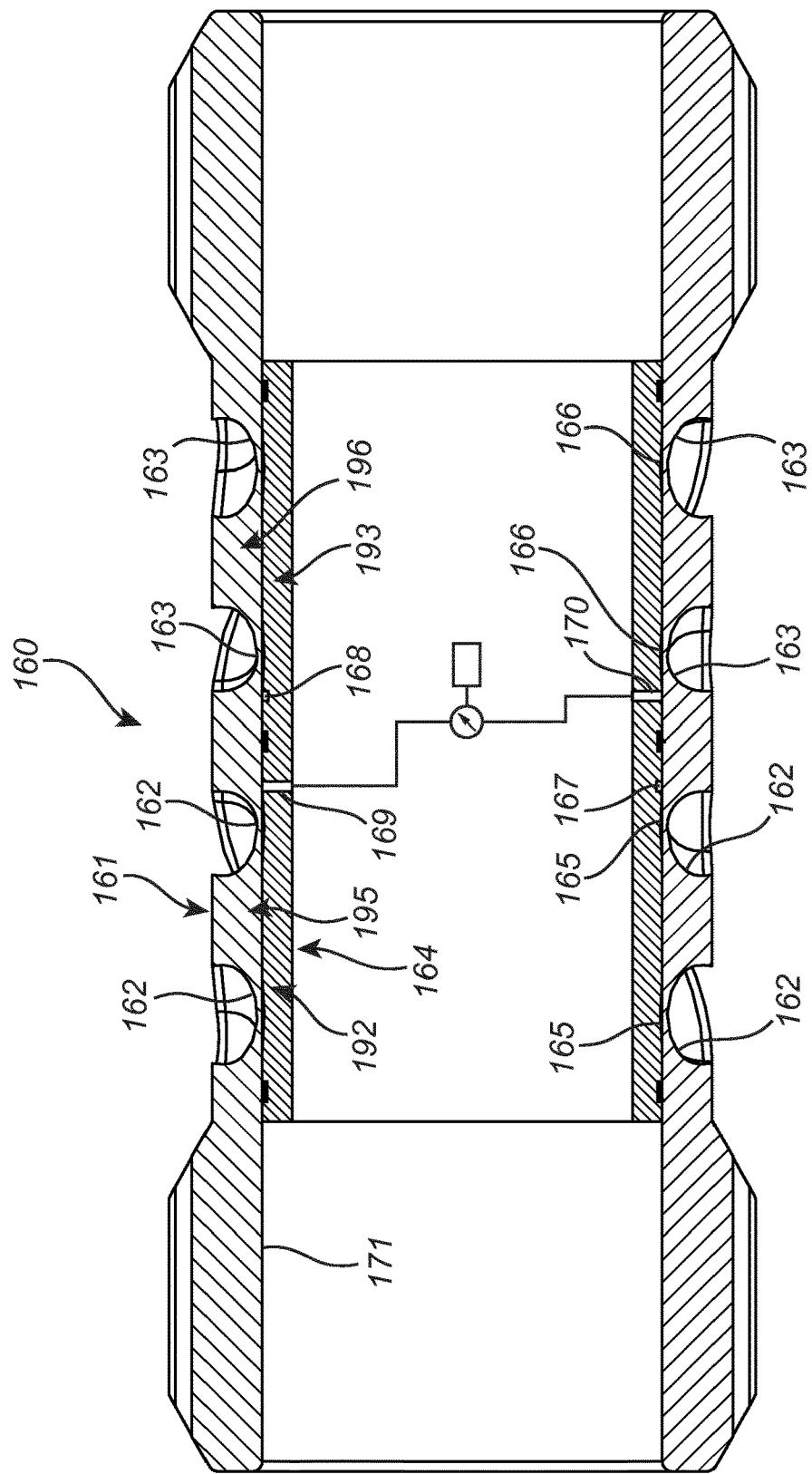
FIG. 13 is a cross-sectional view of an embodiment of the torque sensor according to the present invention.

A sixth embodiment of the torque sensor 160, shown in FIGS. 13 and 14 resembles the fifth embodiment, the primary difference being that the body 161 of the torque sensor 160 is provided with two sets of grooves 162, 163 instead of three sets, and that the inner sleeve 164 consequently is provided with two sets of recesses 165, 166 instead of three sets, and thus with two airtight chambers defined by the spaces of the recesses 165, 166, their respective peripheral notches 167, 168, and portions of the inner surface 171 of the body 161 covering the recesses 165, 166 and the notches 167, 168. Thus, the first and second airtight chambers are defined by first and second chamber housings 192, 193. Each chamber housing 192, 193 generally comprises a main wall 195, 196, which constitutes a portion of the body 161 that comprises the respective grooves 162, 163, and a portion of the sleeve 164. Furthermore, all grooves 162, 163 are equally long, and all recesses 165, 166 are equally long. The sleeve 164 is provided with two through holes 169, 170, one for each airtight chamber.

It should be noted that the third and fifth embodiments, which have one of the gastight chambers divided into two sub-chambers, one at either side of the other gastight chamber, that is between the other gastight chamber and the ends of the body, are even less affected by an environmental temperature gradient on the sensor body along the torque axis. For example, if the torque sensor is used in application where one end is hotter and the other end is colder, then the air chamber that is divided in two sub-chambers besides the other chamber will still have the same average temperature-change induced pressure change as the other chamber, and then the error from such common pressure change will be rejected by the differential pressure sensor.

While the invention has been illustrated and described in detail in the drawings and foregoing description, such illustration and description are to be considered illustrative or exemplary and not restrictive; the invention is not limited to the disclosed embodiments.

For example, more than two airtight chambers can be provided.

The peripherally extending notches can be arranged at any portion of the grooves/recesses, such as in the middle of them appearing to be consecutive individual notch portions each extending between two adjacent grooves/recesses.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

While the present invention has been described in accordance with preferred compositions and embodiments, it is to be understood that certain substitutions and alterations may be made thereto without departing from the spirit and scope of the following claims.

We claim:

1. A torque sensor comprising:
   a body,
   a first gastight chamber defined at least partly by the body,
   a pressure sensor connected with the gastight chamber for measuring the pressure in the gastight chamber, and a pressure to torque converter connected to the pressure sensor, wherein the gastight chamber is arranged to change a volume of the gastight chamber by deformation of the body when the body is subjected to a torque, wherein the body is arranged to be twisted when subjected to the torque, and wherein the volume change causes a change of pressure of the enclosed gas in the gastight chamber; and
   the body being twistable in a first direction to increase the volume of the gastight chamber and in a second direction to decrease the volume of the gastight chamber, the second direction being opposite the first direction.

2. The torque sensor according to claim 1, wherein the first gastight chamber is defined by a first chamber housing comprising a first main wall, which constitutes a portion of the body that comprises deformation enhancing portions, and which is arranged to change measures of the first main wall when the body is subjected to the torque, thereby changing the volume of the gastight chamber.

3. The torque sensor according to claim 2, additionally comprising a second gastight chamber defined by a second chamber housing comprising a second main wall, which constitutes a portion of the body that comprises deformation enhancing portions, and which is arranged to change measures of the second main wall when the body is subjected to the torque, thereby changing the volume of the second gastight chamber, said changes of volume of the first and second gastight chambers being an increase of the volume of one of the first and second gastight chambers and a decrease of the volume of the other when the body is subjected to the torque, wherein the pressure sensor is arranged to measure a pressure difference between the first and the second gastight chambers.

4. A torque sensor comprising:
   a body,
   a first gastight chamber defined at least partly by the body,
   a pressure sensor connected with the gastight chamber for measuring the pressure in the gastight chamber, and a pressure to torque converter connected to the pressure sensor, wherein the gastight chamber is arranged to change a volume of the gastight chamber by deformation of the body when the body is subjected to a torque, wherein the body is arranged to be twisted when subjected to the torque, and wherein the volume change causes a change of pressure of the enclosed gas in the gastight chamber;
   wherein the first gastight chamber is defined by a first chamber housing comprising a first main wall, which constitutes a portion of the body that comprises deformation enhancing portions, and which is arranged to change measures of the first main wall when the body is subjected to the torque, thereby changing the volume of the gastight chamber;

the torque sensor additionally comprising a second gastight chamber defined by a second chamber housing comprising a second main wall, which constitutes a portion of the body that comprises deformation enhancing portions, and which is arranged to change measures of the second main wall when the body is subjected to the torque, thereby changing the volume of the second gastight chamber, said changes of volume of the first and second gastight chambers being an increase of the volume of one of the first and second gastight chambers and a decrease of the volume of the other when the body is subjected to the torque, wherein the pressure sensor is arranged to measure a pressure difference between the first and the second gastight chambers; and wherein the deformation enhancing portions comprise grooves, wherein the torque sensor comprises an outer sleeve arranged coaxially with the body and covering the grooves, and wherein the first and second chamber housings further comprise respective portions of the sleeve covering the grooves.

5. The torque sensor according to claim 4, wherein the body comprises first and second end portions arranged to be connected with external devices, wherein the grooves consist of several interconnected mid-grooves, several interconnected first end grooves, and several interconnected second end grooves, wherein the mid-grooves are arranged equidistantly around the periphery of the center portion and extend obliquely in one direction relative to a torque axis (C) of the body, wherein the first and second end grooves extend obliquely in another direction relative to the torque axis, and are arranged equidistantly around the periphery of the center portion at either end of the mid-grooves, such that the first end grooves are arranged between the first end portion and the mid-grooves, and the second end grooves are arranged between the second end portion and the mid-grooves, wherein the first gastight chamber comprises the mid-grooves, and wherein the second gastight chamber comprises a first sub-chamber comprising the first end grooves, and a second sub-chamber comprising the second end grooves.

6. The torque sensor according to claim 5, wherein the length of each groove of said first and second end grooves is half of the length of each groove of said mid-grooves.

7. The torque sensor according to claim 3, wherein the deformation enhancing portions comprise grooves, wherein the torque sensor comprises an inner sleeve arranged coaxially with the body, wherein the inner sleeve is provided with several recesses at an outer surface of the sleeve, which recesses are longitudinally aligned with the grooves, wherein the first and second chamber housings further comprise respective portions of the sleeve having respective recesses.

8. The torque sensor according to claim 7, wherein the body comprises first and second end portions arranged to be connected with external devices, wherein the grooves consist of several mid-grooves, several first end grooves, and several second end grooves, wherein the mid-grooves are arranged equidistantly around the periphery of the center portion and extend obliquely in one direction relative to a torque axis (E) of the body, wherein the first and second end grooves extend obliquely in another direction relative to the torque axis, and are arranged equidistantly around the periphery of the center portion at either end of the mid-grooves, such that the first end grooves are arranged between the first end portion and the mid-grooves, and the second end grooves are arranged between the second end portion and the mid-grooves, wherein the recesses comprise several interconnected mid-recesses, which are longitudinally aligned with the mid-grooves, several interconnected first end recesses, which are longitudinally aligned with the first end grooves, and several interconnected second end recesses, which are longitudinally aligned with the second end grooves.

9. The torque sensor according to claim 2, comprising opposite first and second end portions arranged to be connected with external devices, said first gastight chamber being positioned between the first and second end portions, wherein the first main wall defines a hollow portion of the body, wherein the first chamber housing further comprises a lid closing an outer end of the first main wall, by means of a gastight attachment to the first main wall.

10. The torque sensor according to claim 9, wherein the lid is cup shaped, having a tubular portion having an outer and an inner end, wherein the gastight attachment is at the outer end of the tubular portion, and having an end wall at the inner end of the tubular portion, wherein the first chamber housing further comprises a wall portion at an inner end of the hollow portion in parallel with the end wall, wherein a clearance is provided between the lid and the first main wall and the wall portion, respectively.

11. A torque sensor comprising:
a body,
a first gastight chamber defined at least partly by the body,
a pressure sensor connected with the gastight chamber for measuring the pressure in the gastight chamber, and a pressure to torque converter connected to the pressure sensor, wherein the gastight chamber is arranged to change a volume of the gastight chamber by deformation of the body when the body is subjected to a torque, wherein the body is arranged to be twisted when subjected to the torque, and wherein the volume change causes a change of pressure of the enclosed gas in the gastight chamber;

wherein the first gastight chamber is defined by a first chamber housing comprising a first main wall, which constitutes a portion of the body that comprises deformation enhancing portions, and which is arranged to change measures of the first main wall when the body is subjected to the torque, thereby changing the volume of the gastight chamber;

the torque sensor additionally comprising a second gastight chamber defined by a second chamber housing comprising a second main wall, which constitutes a portion of the body that comprises deformation enhancing portions, and which is arranged to change measures of the second main wall when the body is subjected to the torque, thereby changing the volume of the second gastight chamber, said changes of volume of the first and second gastight chambers being an increase of the volume of one of the first and second gastight chambers and a decrease of the volume of the other when the body is subjected to the torque, wherein the pressure sensor is arranged to measure a pressure difference between the first and the second gastight chambers; and the torque sensor comprising opposite first and second end portions arranged to be connected with external devices, said first and second gastight chambers being consecutively positioned between the first and second end portions, wherein the deformation enhancing portions comprise several grooves extending obliquely to a torque axis (B) of the torque sensor, which torque axis extends between the first and second end portions.

12. The torque sensor according to claim 11, wherein each main wall of said first and second main walls is a cylindrical portion of the body, and wherein the grooves are formed in an outer surface of the first and second main wall, respectively, wherein the respective grooves of the first and second gastight chambers extend in mutually different directions.

13. The torque sensor according to claim 3, wherein each main wall defines a hollow portion of the body, and wherein each chamber housing further comprises a lid closing an outer end of the main wall, by means of a gastight attachment to the main wall.

14. The torque sensor according to claim 4, wherein the grooves consist of several interconnected first grooves, and several interconnected second grooves, wherein the first grooves are arranged equidistantly around the periphery of the center portion and extend obliquely in one direction relative to a torque axis (D) of the body, wherein the second grooves extend obliquely in another direction relative to the torque axis, and are arranged equidistantly around the periphery of the center portion adjacent to the first grooves, wherein the first gastight chamber comprises the first grooves, and wherein the second gastight chamber comprises the second grooves.

15. The torque sensor according to claim 7, wherein the grooves consist of several first grooves, and several second grooves, wherein the first grooves are arranged equidistantly around the periphery of the center portion and extend obliquely in one direction relative to a torque axis (F) of the body, wherein the second grooves extend obliquely in another direction relative to the torque axis, and are arranged equidistantly around the periphery of the center portion adjacent to the first grooves, wherein the recesses comprise several interconnected first recesses, which are longitudinally aligned with the first grooves, and several interconnected second recesses, which are longitudinally aligned with the second grooves.

* * * * *